United States Patent
Villiard et al.

(10) Patent No.: US 7,123,450 B1
(45) Date of Patent: Oct. 17, 2006

(54) TRANSDUCER POSITIONING DEVICE UTILIZING A GUIDE MEMBER MOUNTED WITH FLEXIBLE MEMBERS

(75) Inventors: Jeffrey G. Villiard, Broomfield, CO (US); Mark L. Watson, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 505 days.

(21) Appl. No.: 10/716,895

(22) Filed: Nov. 18, 2003

(51) Int. Cl.
G11B 5/55 (2006.01)

(52) U.S. Cl. .................................. 360/261.1

(58) Field of Classification Search ............ 360/261.1, 360/266.5, 266.6, 267.5, 267.6
See application file for complete search history.

(56) References Cited

U.S. PATENT DOCUMENTS

| | | | |
|---|---|---|---|
| 4,504,879 A | 3/1985 | Toldi et al. | |
| 4,528,607 A | 7/1985 | Thompson | |
| 4,663,677 A | 5/1987 | Griffith et al. | |
| 4,663,682 A | 5/1987 | McNeil | |
| 4,683,506 A | 7/1987 | Toldi et al. | |
| 4,722,012 A | 1/1988 | Toldi et al. | |
| 4,730,227 A | 3/1988 | Chong et al. | |
| 4,740,851 A | 4/1988 | Jones et al. | |
| 4,787,000 A | 11/1988 | Schulze | |
| 4,811,143 A | 3/1989 | Ohashi et al. | |
| 4,901,173 A | 2/1990 | Jones et al. | |
| 4,965,685 A | 10/1990 | Thompson et al. | |
| 5,027,241 A | 6/1991 | Hatch et al. | |
| 5,172,367 A | 12/1992 | Hinotani | |
| 5,291,359 A | 3/1994 | Wolter | |
| 5,508,864 A | 4/1996 | Briggs et al. | |
| 5,530,607 A | 6/1996 | Spendlove | |
| 5,566,039 A * | 10/1996 | Spicer | 360/261.1 |
| 5,615,204 A | 3/1997 | Watanabe | |
| 5,920,445 A | 7/1999 | Angellotti et al. | |
| 6,437,946 B1 | 8/2002 | Todd | |
| 6,442,003 B1 | 8/2002 | Jones et al. | |
| 6,594,118 B1 * | 7/2003 | Nayak et al. | 360/261.1 |

* cited by examiner

Primary Examiner—A. J. Heinz
(74) Attorney, Agent, or Firm—Brooks Kushman P.C.

(57) ABSTRACT

A transducer positioning apparatus includes a frame, a flexible member attached to the frame, and a guide member suspended from the frame by the flexible member. A carriage with a transducer mounted thereon is movable with respect to the guide member between multiple positions relative to the guide member. The apparatus further includes an actuator associated with the carriage. The actuator is operative to move the carriage with respect to the guide member to a selected position of the multiple positions and to move the carriage and the guide member relative to the frame to locate the transducer in a desired position. Furthermore, the flexible member is configured to allow axial movement of the guide member while inhibiting rotational movement of the guide member.

13 Claims, 2 Drawing Sheets

TRANSDUCER POSITIONING DEVICE UTILIZING A GUIDE MEMBER MOUNTED WITH FLEXIBLE MEMBERS

BACKGROUND OF THE INVENTION

1. Field of the Invention

The invention relates to transducer positioning devices for media drives.

2. Background Art

Transducer positioning devices are used in media drives to align a transducer with respect to a media track or tracks. Examples of transducer positioning devices are disclosed in U.S. Pat. No. 6,437,946.

SUMMARY OF THE INVENTION

Under the invention, a transducer positioning apparatus includes a frame, a flexible member attached to the frame, and a guide member suspended from the frame by the flexible member. A carriage with a transducer mounted thereon is movable with respect to the guide member between multiple positions relative to the guide member. The apparatus further includes an actuator associated with the carriage. The actuator is operative to move the carriage with respect to the guide member to a selected position of the multiple positions and to move the carriage and the guide member relative to the frame to locate the transducer in a desired position. Furthermore, the flexible member is configured to allow axial movement of the guide member while inhibiting rotational movement of the guide member.

DETAILED DESCRIPTION OF THE PREFERRED EMBODIMENT(S)

Figure 1:
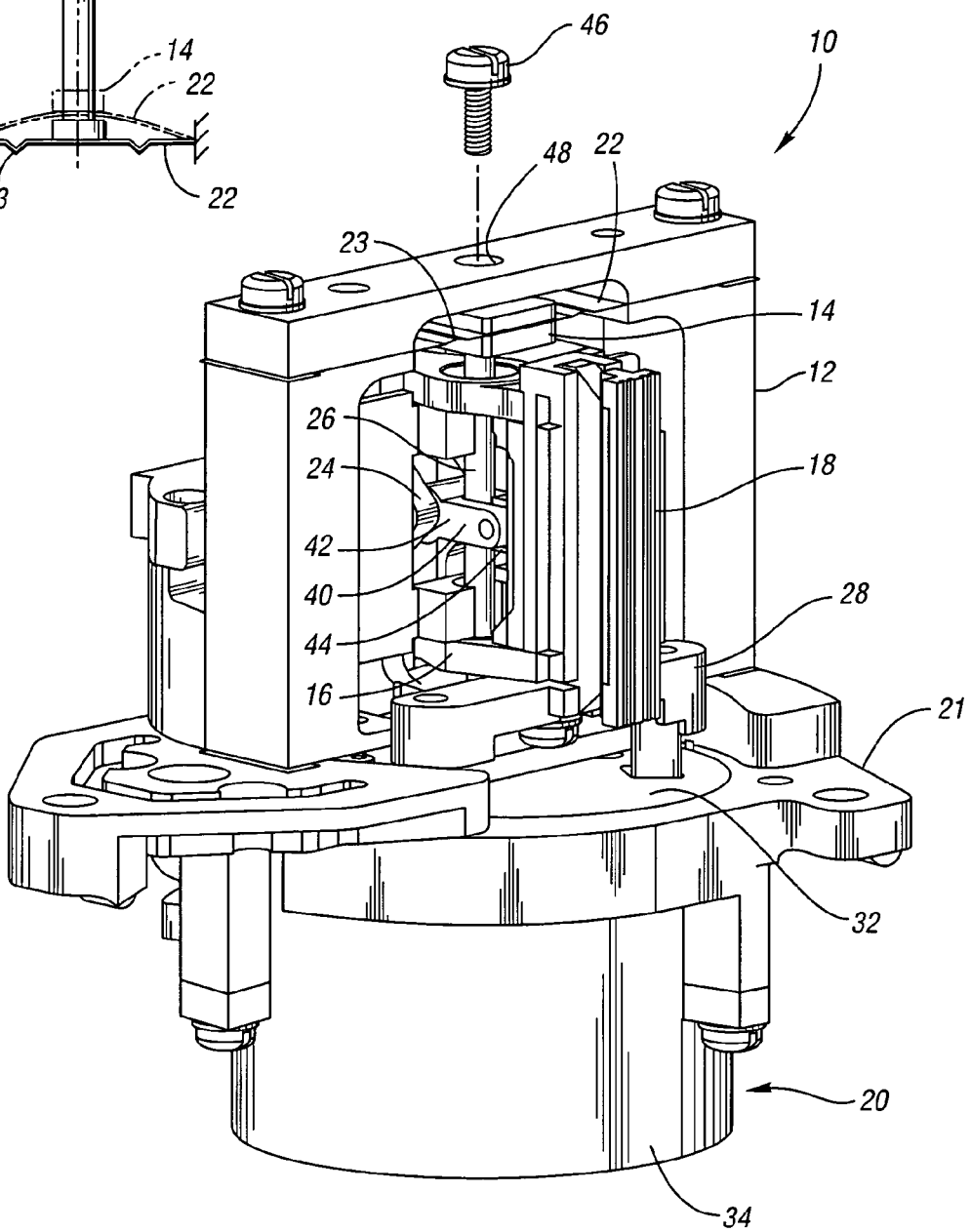
FIG. 1 is a perspective view of a transducer positioning apparatus according to the invention for use with a media drive, wherein the apparatus includes a fixed frame, first and second carriages movably associated with the fixed frame, a transducer mounted on the second carriage, and an actuator associated with the second carriage for positioning the transducer.

FIG. 1 shows a transducer positioning apparatus 10 according to the invention for use with a media drive, such as a tape drive or disc drive. The apparatus 10 includes a frame, such as a fixed frame 12, first and second carriages 14 and 16, respectively, movably associated with the fixed frame 12, a transducer 18 mounted on the second carriage 16, and an actuator 20 associated with the second carriage 16 for locating the transducer 18 in a desired position, as explained below in detail.

The fixed frame 12 is configured to be attached to a drive body (not shown) of the media drive, such that the fixed frame 12 remains stationary with respect to the drive body. For example, a lower portion 21 of the fixed frame 12 may be attached to the drive body with fasteners, such as screws.

The first carriage 14 is suspended from the fixed frame 12 with one or more flexible spring members 22, such as leaf springs. In the embodiment shown in FIGS. 1–3, the apparatus 10 includes two spring members 22 that are each fixedly attached at each end to the fixed frame 12, with fasteners for example, such that the spring members 22 are constrained at their ends. Central portions of the spring members 22 are attached to the first carriage 14 proximate opposite ends of the first carriage 14. Furthermore, the spring members 22 may be configured to allow movement of the first carriage 14 with respect to the fixed frame 12. For example, each spring member 22 may include bent portions 23, such as folds and/or radiused bends, that lengthen upon flexing of the spring member 22. With the configuration described above, the spring members 22 may allow translation of the first carriage 14, while inhibiting rotational movement of the first carriage 14.

Figure 2:
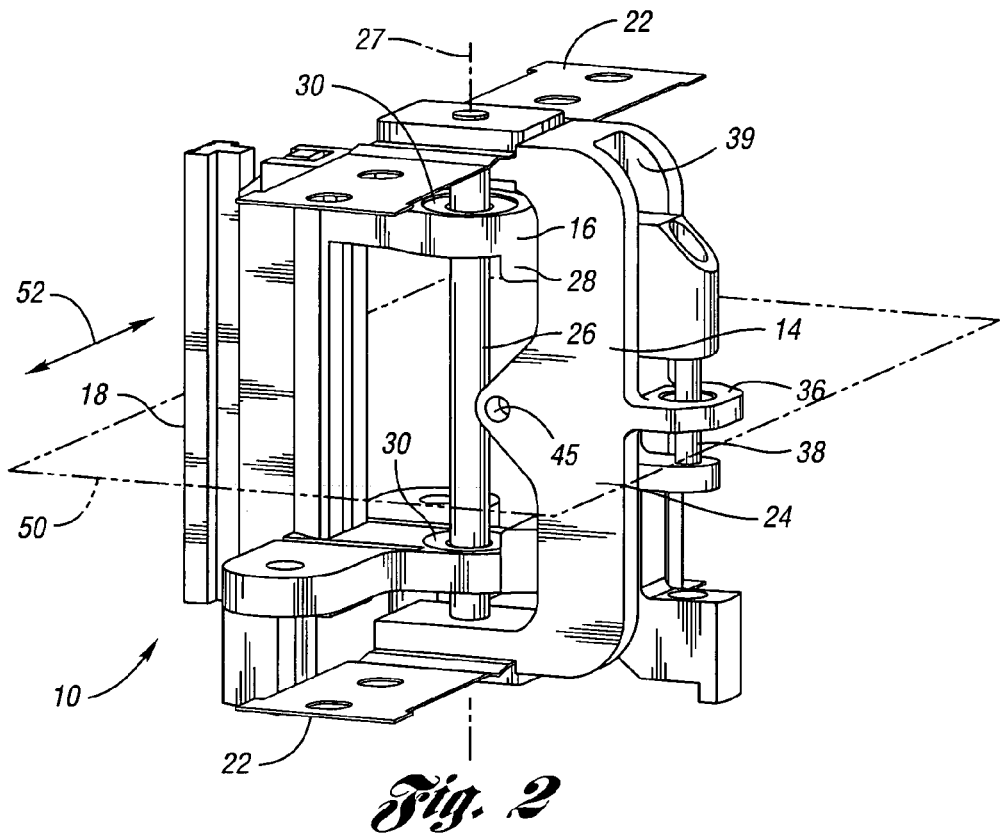
FIG. 2 is a perspective view of the carriages and transducer of the apparatus of FIG. 1.
Figure 3:
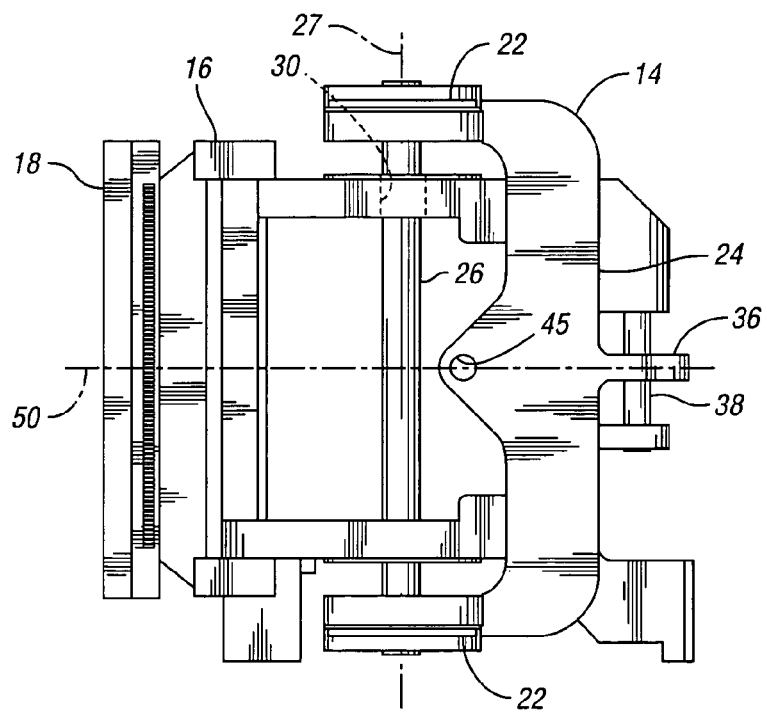
FIG. 3 is a side view of the carriages and transducer of FIG. 2.

Referring to FIGS. 1–3, the first carriage 14 includes a first carriage body 24, such as an outer carriage body, and one or more first guide members 26 attached to the first carriage body 24 for guiding movement of the second carriage 16. While the first guide member 26 may comprise any suitable guide element or elements, such as bearings, bushings and/or rails, in the embodiment shown in FIGS. 1–3, the first guide member 26 comprises a guide track or rod fixedly attached to the first carriage body 24. The first guide member 26 also has an axis 27 along which the second carriage 16 may move.

Furthermore, the first carriage body 24 and/or first guide member 26 may be fixedly secured to each spring member 22. For example, the first carriage body 24 and/or first guide member 26 may be joined to each spring member 22 with a swage joint. As another example, the first carriage body and/or first guide member 26 may be press fit, welded and/or adhesively bonded to each spring member 22. Thus, the first guide member 26 may be attached directly or indirectly to the spring members 22 such that the first guide member 26 is suspended by the spring members 22.

Figure 4:
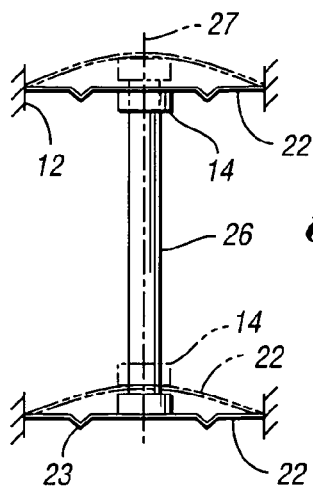
FIG. 4 is a schematic view of the first carriage suspended from the fixed frame by a pair of constrained flexible members.

With the configuration described above, the spring members 22 may allow movement of the first carriage 14 in a direction generally parallel to the axis 27, while inhibiting rotational movement of the first carriage 14 about the axis 27 as well as any axis generally perpendicular to axis 27. Referring to FIG. 4, for example, the spring members 22 may allow translation of the first carriage 14 in a direction generally parallel to the axis 27 between a first position shown in solid lines and a second position shown in phantom lines, while inhibiting rotational or twisting movement of the first carriage 14.

Returning to FIGS. 1–3, the second carriage 16 includes a second carriage body 28, such as an inner carriage body, and one or more second guide members 30 attached to the second carriage body 28 for guiding movement of the second carriage body 28. While each second guide member 30 may comprise any suitable guide element or elements, such as rods, tracks and/or rails, in the embodiment shown in FIGS. 1 and 2, the second guide members 30 comprise two guide bearings or bushings, such as jewel bearings, that are slidable along the first guide member 26. Moreover, the second carriage 16 is movable with respect to the first carriage 14 between multiple positions relative to the first carriage 14.

The transducer 18 is fixedly mounted on the second carriage 16 such that the transducer 18 is movable with the second carriage 16. Moreover, the transducer 18 may comprise a read transducer, a write transducer, or any combination thereof, such that the transducer 18 may perform read and/or write operations on media, such as tape or discs.

The actuator 20 may comprise any suitable device sufficient to move the second carriage 16 to a selected position of the multiple positions relative to the first carriage 14, and to move the first carriage 14 and the second carriage 16 relative to the fixed frame 12 to locate the transducer 18 in a desired position relative to data written on media. For example, the actuator 20 may comprise a first actuator portion 32, such as a voice coil, attached to the second carriage body 28, and a second actuator portion 34, such as a magnet assembly, attached to the fixed frame 12. When energized, the second actuator portion 34 is operative to induce movement of the first actuator portion 32 and the second carriage 16 relative to the second actuator portion 34.

The apparatus 10 may also include one or more anti-rotation members for inhibiting rotational movement of the second carriage 16 with respect to the first carriage 14. For example, the apparatus 10 may include first and second anti-rotation members 36 and 38, respectively, such as rods, rails, tracks and/or bearings, that cooperate with each other to inhibit rotational movement of the second carriage 16. In the embodiment shown in FIGS. 1–3, the first anti-rotation member 36 includes a bearing or bushing attached to the first carriage body 24, and the second anti-rotation member 38 includes a rod attached to the second carriage body 28. As the second carriage 16 moves with respect to the first carriage 14, the first anti-rotation member 36 allows sliding movement of the second anti-rotation member 38, while inhibiting rotational movement of the second carriage 16 about axis 27. As another example, the first anti-rotation member 36 may comprise a rod or rail, and the second anti-rotation member 38 may comprise a bearing or bushing that slides along the first anti-rotation member 36.

Alternatively or supplementally, the carriage bodies 24 and 28 may define anti-rotation members. For example, the first carriage body 24 may include a channel 39 configured to slidably receive a portion of the second carriage body 28 and to inhibit rotational movement of the second carriage body 28. As another example, the second carriage body 28 may include a channel that slides along a portion of the first carriage body 24.

Furthermore, the apparatus 10 may be configured to inhibit movement of the second carriage 16 with respect to the first carriage 14 when the second carriage 16 has achieved a desired or selected position relative to the first carriage 14. For example, the apparatus 10 may include a mechanical locating system 40, such as a detent mechanism and/or linkage/spring system, for holding the second carriage 16 in a desired discrete position relative to the first carriage 14.

In the embodiment shown in FIG. 1, the mechanical locating system 40 is configured as an over-the-center linkage/spring system that includes a link 42 pivotally connected to the first carriage 14 and engageable with the guide member 26, and a spring 44 pivotally connected to the link 42 and engageable with the second carriage 16. The link 32 may be pivotally connected to the first carriage 14 at aperture 45, for example, which is shown in FIGS. 2 and 3. When the actuator 20 applies a force on the second carriage 16, the spring members 22 may flex, thereby allowing axial movement of the carriages 14 and 16, until the force exerted by the spring members 22 on the first carriage 14 is greater than the retarding force exerted by the mechanical locating system 40. At that point, the mechanical locating system 40 may allow movement of the second carriage with respect to the guide member 26. For example, the spring 44 may slide along the second carriage 16, thereby allowing the second carriage 16 to slide along the guide member 26 until the second carriage 16 reaches a desired position relative to the guide member 26. During this process, the link 42 and/or spring 44 of the mechanical locating system 40 may pivot, thereby affecting the force exerted by the link 42 and/or spring 44 on the guide member 26 and/or second carriage 16. When the second carriage 16 reaches the desired position, the mechanical locating system 40 may be used to maintain the second carriage 16 in that position.

As another example, the apparatus 10 may be provided with a stop for inhibiting movement of the first carriage 14 in order to allow the second carriage 16 to move with respect to the first carriage 14. For example, a set screw 46 may be inserted into an aperture 48 of the fixed frame 12 to define a stop for the first carriage 14. When the first carriage 14 engages the screw 46, the mechanical locating system 40 may then allow the second carriage 16 to move with respect to the first carriage 14.

As yet another example, the mechanical locating system 40 may be configured as a detent mechanism such as disclosed in U.S. Pat. No. 6,437,946, which is hereby incorporated by reference in its entirety. Such a detent mechanism may be disposed between the carriages 14 and 16 and include an engaging member, such as a click, that selectively engages multiple notches or recesses to selectively position the second carriage 16 with respect to the first carriage 14.

Alternatively or supplementally, the apparatus 10 may be configured such that friction forces between the carriages 14 and 16 function to inhibit movement of the second carriage 16 with respect to the first carriage 14 when the second carriage 16 is in a desired position relative to the first carriage 14. For example, friction forces between the guide members 26 and 30 and/or between the anti-rotation members 36 and 38 may function to hold the second carriage 16 in a desired position relative to the first carriage 14.

Operation of the apparatus 10 will now be described in detail. First, the actuator 20 may be used to coarsely position the transducer 18, such as within an appropriate band of tracks on a tape or disk. More specifically, referring to FIG. 1, the actuator 20 may be used to slide the second carriage 16 along the first guide member 26. As mentioned above, the first carriage 14 may initially move with the second carriage 16 until the retarding force of the mechanical locating system 40 and/or friction forces between the carriages 14 and 16 are exceeded. Upon reaching a selected position relative to the first carriage 14, the mechanical locating system 40 and/or friction forces between the carriages 14 and 16 may be used to hold the second carriage 16 in the selected position.

Next, the actuator 20 may be used to finely position the transducer 18, such as with respect to a particular track or tracks. More specifically, the actuator 20 may be used to move the carriages 14 and 16 with respect to the fixed frame 12, while the second carriage 16 is maintained in the selected position relative to the first carriage 14. Because each spring member 22 is constrained at each end, the spring members 22 allow movement of the carriages 14 and 16 with respect to the fixed frame 12 in a direction generally parallel to the axis 27, while inhibiting rotational movement of the carriages 14 and 16.

With the configuration described above, the carriages 14 and 16 and the first actuator portion 32 cooperate to form at least part of a suspended mass that is suspended by the spring members 22. While not required, the center of mass of the suspended mass may be generally axially aligned with the axis 27, thereby reducing unwanted motion or resonances due to forces internal and external to the apparatus 10.

Furthermore, the position of the transducer 18 relative to the second guide members 30 may inhibit rotational movement of the second carriage 16 relative to the first carriage 14. Referring to FIGS. 2 and 3, for example, the transducer 18 may be positioned such that a plane 50 bisecting the transducer 18 extends between the second guide members 30 and generally perpendicular to the axis 27. The plane 50 also extends between opposite ends of each of the carriages 14 and 16. With such a configuration, twisting of the second carriage 16 relative to the first carriage 14 may be reduced or eliminated as media, such as tape, travels over the transducer 18. As shown in FIG. 2, the direction of travel 52 of media across the transducer 18 may be generally perpendicular to the axis 27.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the first guide member of the first carriage may be configured as one or more bearings, and the second guide member of the second carriage may be configured as a rod, track or rail that is slidable along the first guide member. As another example, while the apparatus shown in the Figures is configured for use with a tape drive, an apparatus according to the invention may instead be configured for use with a disc drive.

What is claimed is:

1. A transducer positioning apparatus comprising:
   a frame;
   a flexible member attached to the frame;
   a guide member suspended from the frame by the flexible member;
   a carriage that is movable with respect to the guide member between multiple positions relative to the guide member;
   a transducer mounted on the carriage; and
   an actuator associated with the carriage, the actuator being operative to move the carriage with respect to the guide member to a selected position of the multiple positions and to move the carriage and the guide member relative to the frame to locate the transducer in a desired position;
   wherein the flexible member is configured to allow axial movement of the guide member while inhibiting rotational movement of the guide member.

2. The apparatus of claim 1 wherein the flexible member has first and second ends that are each attached to the frame.

3. The apparatus of claim 1 further comprising an additional flexible member, wherein each flexible member has first and second opposite ends that are each attached to the frame, and wherein the guide member is disposed between the flexible members.

4. The apparatus of claim 3 wherein each flexible member comprises a leaf spring.

5. The apparatus of claim 1 wherein the guide member includes an elongated guide body, and the carriage is movable along the guide member between the multiple positions.

6. The apparatus of claim 1 further comprising an anti-rotation member associated with the carriage for inhibiting rotational movement of the carriage as the carriage moves with respect to the guide member.

7. The apparatus of claim 6 wherein the guide member is positioned between the transducer and the anti-rotation member.

8. The apparatus of claim 6 wherein the anti-rotation member is fixed to the carriage.

9. The apparatus of claim 1 wherein the carriage includes first and second guide elements that are movable along an axis of the guide member, and wherein a plane bisecting the transducer extends between the guide elements and generally perpendicular to the axis.

10. A transducer positioning apparatus comprising:
    a fixed frame;
    first and second spring members that each have first and second ends attached to the fixed frame;
    a first carriage suspended from the fixed frame by the spring members, the first carriage including an elongated main guide member and a first anti-rotation member;
    a second carriage movably associated with the first carriage such that the second carriage is movable along the main guide member between multiple positions relative to the main guide member, the second carriage including a second anti-rotation member that cooperates with the first anti-rotation member to inhibit rotation of the second carriage as the second carriage moves along the main guide member;
    a transducer mounted on the second carriage; and
    an actuator associated with the second carriage, the actuator being operative to move the second carriage along the main guide member to a selected position of the multiple positions and to move the first carriage and the second carriage relative to the fixed frame when the second carriage is in the selected position relative to the main guide member;
    wherein the spring members are configured to allow axial movement of the first carriage while inhibiting rotational movement of the first carriage.

11. The apparatus of claim 10 wherein the second carriage includes first and second bearings that are movable along an axis of the main guide member, and wherein a plane bisecting the transducer extends between the bearings and generally perpendicular to the axis.

12. The apparatus of claim 11 wherein the main guide member is positioned between the transducer and the anti-rotation member.

13. The apparatus of claim 12 wherein the actuator includes an actuator portion attached to the second carriage, and wherein the first carriage, second carriage and actuator portion cooperate to at least partially define a suspended mass having a center of mass that is generally axially aligned with the guide member.

* * * * *